United States Patent [19]

Lea

[11] 3,719,495

[45] March 6, 1973

[54] USE OF MEROCYANINE COMPOUNDS IN PHOTOTHERMOSENSITIVE SYSTEMS

[75] Inventor: Bernard A. Lea, London, England

[73] Assignee: Minnesota Mining and Manufacturing Company, St. Paul, Minn.

[22] Filed: Sept. 29, 1970

[21] Appl. No.: 76,628

[30] Foreign Application Priority Data

Oct. 3, 1969 Great Britain......................47,850/69

[52] U.S. Cl. ...............96/114.1, 96/114.6, 117/36.8, 96/127
[51] Int. Cl. ..............................................G03c 1/02
[58] Field of Search..........96/114.1, 114.6, 127, 139, 96/140; 250/65.1; 117/36.8, 36.9

[56] References Cited

UNITED STATES PATENTS

| R26,719 | 11/1969 | Sorensen | 96/63 |
|---|---|---|---|
| 2,635,961 | 4/1953 | Carroll | 96/127 |
| 2,739,965 | 3/1956 | Knott | 96/127 |
| 2,759,822 | 8/1956 | Jones | 96/140 |
| 3,457,075 | 7/1969 | Morgan | 96/67 |
| 3,549,379 | 12/1970 | Hellings | 96/114.1 |
| 3,557,101 | 1/1971 | Taber | 96/127 |
| 3,576,639 | 4/1971 | Jenkins | 96/127 |

Primary Examiner—J. Travis Brown
Assistant Examiner—Judson R. Hightower
Attorney—Kinney, Alexander, Sell, Steldt & Delahunt

[57] ABSTRACT

A light-sensitive system including an intimate mixture of a light-insensitive silver salt which yields a visible change upon reduction, and light-sensitive silver halide in an amount sufficient to catalyze reduction of the light-insensitive silver salt upon exposure of the system to light followed by heating in the presence of a reducing agent, the mixture being characterized by including a tri-nuclear merocyanine dye capable of sensitizing the mixture to the longer wavelength portion of the visible spectrum. Also described are novel merocyanine dyes and light-sensitive sheets containing the above-described mixture.

18 Claims, No Drawings

USE OF MEROCYANINE COMPOUNDS IN PHOTOTHERMOSENSITIVE SYSTEMS

This invention relates to photo-sensitive compositions and more especially to the sensitization of such compositions, and also to certain compounds which act as sensitizers for such compositions.

One particular type of photo-sensitive composition comprises an intimate mixture of a light-sensitive silver halide and another silver compound such as a silver salt of an organic acid, e.g., silver behenate or silver saccharine, which latter silver compound upon reduction gives a visible change and which is substantially light-insensitive. Such a mixture is usually prepared in suspension and spread on a suitable substrate. When dry, the resulting layer is exposed to a light image and thereafter a reproduction of the image can be developed by heating the layer in the presence of a reducing agent such as hydroquinone or certain substituted phenols.

Because the exposure and development of the layer occur without using water, these materials are often referred to as "dry silver" light-sensitive materials. Examples of these dry silver materials are found in British Pat. No. 1,110,046 which describes a photographic material in which minor amounts of a photo-sensitive silver halide catalyst-progenitor are associated in catalytic proximity with major amounts of a heat-sensitive oxidation-reduction image forming reaction mixture which reacts more rapidly under the influence of the catalyst which results upon exposure of the silver halide.

When the mixture is exposed to light, a latent image is believed formed in the silver halide. Thereafter, the silver compound can be reduced by heating with the reducing agent, this reduction being catalyzed imagewise by the light-exposed silver halide. By a suitable choice of temperature, the reduction of the silver compound can be catalyzed in the light-exposed areas to give a visible darkening while any slight reduction which occurs in the non-light exposed areas is insufficient to give a marked change. Of course, because the silver halide acts as a catalyst, only very small amounts of it are required, e.g., 0.1 to 10 percent by weight of the mixture.

The mixture of silver halide and other silver compound alone is not evenly sensitive to all parts of the radiation spectrum and accordingly one or more sensitizing dyes may be added. Although attempts have been made using dyes to improve the sensitivity of the mixtures to light of wavelengths at the red end of the spectrum, the results have been poor. In particular, attempts have been made to use cyanine dyes which, in conventional gelatino silver halide photographic materials, act as excellent sensitizers for the longer wavelengths of light and particularly red light. However, these cyanine dyes tend to give only poor results when used to sensitize "dry silver" materials.

It is, therefore, an object of the invention to improve the sensitization of these photo-sensitive silver halide and other silver compound mixtures to light of longer wavelengths and particularly to red light and also to provide various dyes for this purpose.

According to the invention there is provided a light-sensitive composition comprising an intimate mixture of a substantially light-sensitive silver compound which upon reduction gives a visible change and sufficient silver halide to catalyze this reduction to give a visible change in those areas where the silver halide has been exposed to light and the mixture is heated in the presence of a reducing agent, and a merocyanine dye having the general formula:

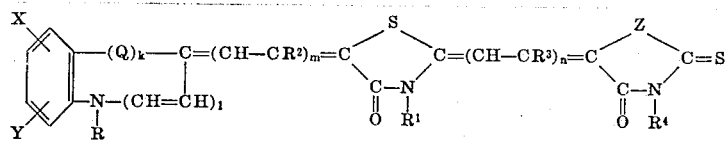

in which $k$ and $l$ are each 0 or 1 and, when $k$ is 0, $l$ is 1 and when $k$ is 1, $l$ is 0, Q represents —S—, —Se—, —CH=CH—, —O—,

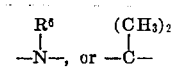

where $R^6$ represents a lower alkyl group or a lower alkyl group containing as ester group, (e.g., —CH$_2$-CH$_2$——COOC$_2$H$_5$ or —CH$_2$-CH$_2$O.COCH$_3$); $m$ and $n$ are each 0 or 1; R represents an alkyl, hydroxyalkyl, carboxyalkyl or sulfoalkyl group (preferably alkyl), $R^1$ represents an aryl or aralkyl group or any of the groupings represented by R (preferably alkyl or carboxyalkyl); $R^2$ and $R_3$ each independently of one another represents a hydrogen atom or a lower alkyl group; X and Y each independently of one another represents a hydrogen or halogen atom or a lower alkyl, alkoxy, (e.g., methoxy), aryl, amino or acylamino group, or X and Y together constitute a divalent methylene dioxy group or represent the carbon atoms required to form a fused on carbon ring, and Z represents —S—, —O—,

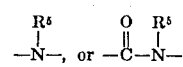

so as to complete a heterocyclic ring such as, for example:

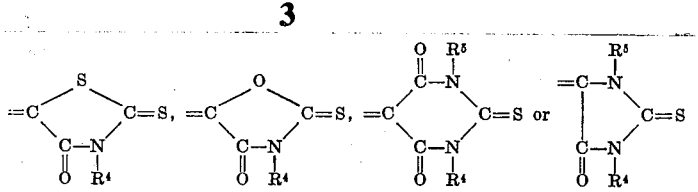

and $R^4$ and $R^5$, which may be the same or different, each represent a hydrogen atom or any of the groupings represented by $R^1$ including the groupings $R^7COOH$ and $R^7SO_3H$ where $R^7$ represents a lower alkylene group.

It is found that these merocyanine dyes give excellent sensitization of "dry silver" materials to light in the orange and red end of the spectrum. Thus, it is possible to make these materials sensitive to the full breadth of the visible spectrum and to some extent beyond the edges of the visible spectrum. In particular, the photosensitive materials of the invention have been found to have useful sensitivity at the far red end of the visible spectrum and so they are found to be useful in recoding images from certain red laser beams, e.g., a helium-neon laser.

The tri-nuclear merocyanine dyes of the invention may be incorporated in the photo-sensitive mixtures before they are spread on a support or may be contacted with (e.g., coated upon) a layer of the light-sensitive mixture before exposure to an image. Preferably, however, the dye is incorporated as a solution in a suitable solvent (e.g., trichloroethylene, methanol, chloroform or acetone) into the light-sensitive mixture before the latter is spread on a suitable support.

These dyes may be incorporated in amounts of from 0.01 to 2.0 g and preferably from 0.4 to 1.0 g of dye per gram mole of total silver in the light-sensitive mixtures. As noted above the light-sensitive composition will normally be spread for use on a support, suitable supports including, for example, paper, polyester or polyamide film bases, and glass. The composition will normally be prepared as a solution or suspension which is spread as a layer on the support and then the solvent or vehicle is evaporated away to leave a dry photosensitive layer. If desired, a coating aid or binder such as polyvinyl butyral, polymethyl methacrylate, cellulose acetate, polyvinyl acetate, cellulose acetate-propionate and cellulose acetate butyrate, can be incorporated in the light-sensitive mixture. The support may, of course, bear other layers as well as the light-sensitive layer referred to above, such as a layer containing a reducing agent for the light-insensitive silver compound, in contact with the light-sensitive layer.

The substantially light-insensitive silver compound is suitably a silver salt of an organic acid. Examples include silver behenate, silver caprate, silver laurate, silver myristate, silver palmitate, silver stearate, silver arachidate and silver saccharine.

The reducing agent for this substantially light-insensitive silver compound can normally be quite mild. Suitable examples include hydroquinone and substituted phenols such as methylhydroxy-naphthalene, methyl gallate, catechol, phenylene diamine, p-aminophenol and 1 - phenyl 3 - pyrazolidone. The reducing agent preferably is incorporated into the light-sensitive composition prior to coating of the composition on a support. In another embodiment, the composition can be placed in contact with the reducing agent after exposure to light. For example, a light-sensitive coating may be exposed to a light image and the image may then be developed by heating this coating in contact with a layer containing the reducing agent. The stability of the composition is also improved by incorporating in the composition a small amount of a stabilizer such as an acid stabilizer, e.g., succinic acid, benzoic acid or salicyclic acid.

The silver halide can be present in quite small amounts, e.g., 0.1 to 10 percent by weight of the mixture of silver compounds. It can be added as such to the substantially light-insensitive silver compound, or silver halide can be formed in situ by adding a soluble halide, e.g., a mercury or sodium halide to the substantially light-insensitive silver compound. The latter course is preferred since this ensures a very intimate mixture of the silver compounds and improves the catalytic effect of the light-exposed silver halide. The silver halide can, for example, be the chloride, bromide or mixture of them and/or other silver halides.

Of course, the light-sensitive compositions of the invention can include one or more other sensitizing dyes to improve their sensitivity to parts of the spectrum other than the longer wavelengths referred to above.

According to another aspect of the invention, merocyanine dyes are provided which have the following general formula:

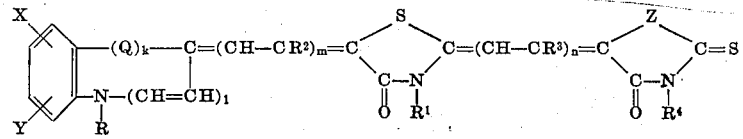

in which $k, l, m, n, Z, Q, R, R^1, R^2$ and $R^3$ are as defined above, and $R^4$ and $R^5$, which may be the same or different, are as defined above with the proviso that $R^4$ or $R^5$ or both $R^4$ and $R^5$ represent the grouping — $R^7COOH$ (preferably) or —$R^7SO_3H$, where $R^7$ is as defined above.

The merocyanine dyes used in the invention can be prepared in any convenient manner. In general, however, they are prepared by heating an initial merocyanine dye having the general formula:

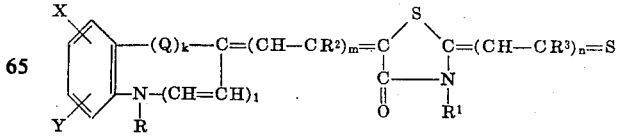

in which R, R¹, R², X, Y, k, l and m are as defined above, with a quaternizing agent such as an ester, e.g., methyl-toluene p-sulfonate, which is preferably in excess. Desirably an inert solvent is also present. The quaternary derivative thus formed is then separated from excess reagents and condensed with a compound having the general formula:

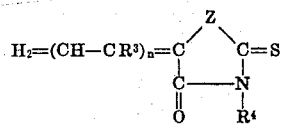

in which R³, R⁴, Z and n are as defined above.

This condensation can be effected by heating a mixture of the reagents in a suitable solvent such as ethanol in the presence of a base and an acid binding agent, e.g., triethylamine. An excess of the base may be employed as the solvent in place of a separate solvent, e.g., pyridine.

The initial dyes used in the above process are either known or are of a class which is well known. Suitable ways of making these initial dyes are described, for example, in Hamer, *Cyanine Dyes and Related Compounds*, Interscience Publishing Co., 1964; United Kingdom Pat. Specifications Nos. 428,222; 428,359 and 519,895, and JACS, 73, 5326-8.

Examples of merocyanine dyes which have been found to give excellent sensitization of the light-sensitive compositions according to the invention are the following dyes A, B, C and D:

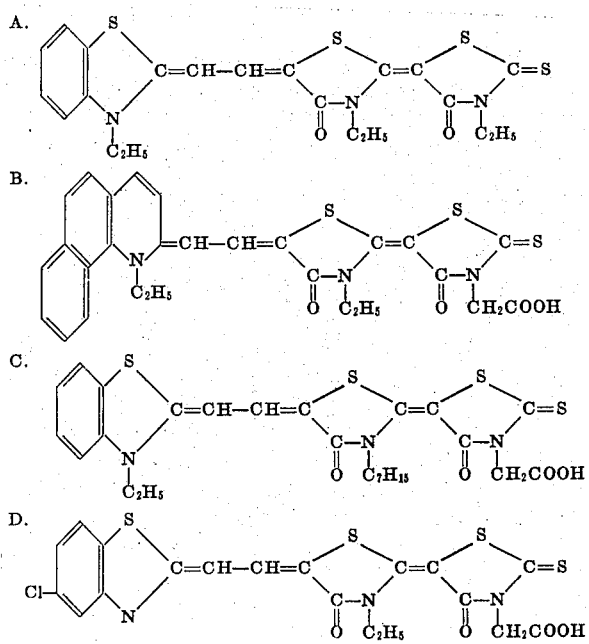

The absorption spectra of these dyes is such that the extent of sensitivity is 725, >725 and >725 nm, and the peak of sensitivity is 650, 700 and 625 nm, for the dyes A, B and C, respectively, and the peak sensitivity is 590 nm for the dye D. They have, therefore, absorption spectra which make them eminently suitable for use in sensitizing light-sensitive materials to light at the red end of the spectrum.

The following Examples 1 to 38 illustrate the preparation of dyes which have found to be particularly useful in the sensitization of light-sensitive compositions according to the invention, while Example 39 illustrates the use of these dyes in compositions according to the invention.

EXAMPLE 1

3-Ethyl-5[(3-ethyl-2-benzothiazolinylidene) ethylidene] -2(3-ethyl-4-oxo-2-thio-5-thiazolidinylidene)-4-thiazolidone. (Dye A)

3-Ethyl-5[(3-ethyl-2-benzoithiazolinylidene) ethylidene] -2-thio-4-thiazolidone (14 g) was heated with methyl toluene p-sulphonate (28 g) at 130°C for 4½ hours. Excess ester was then washed away with dry ether. The residue was mixed with a mixture of 3-ethyl-2thiothiazolid-4-one (6.4 G), ethanol (300 ml) and triethylamine (10 ml). After heating under reflux for 25 minutes the mixture was filtered hot and the residue washed with hot ethanol and then ether. The crude dye (14 g) was purified by boiling first with methanol (350 ml) and then benzene (300 ml) to leave the dye (12 g) as dark green micro crystals with a melting point of 323°C with decomposition.

EXAMPLE 2

3-Ethyl-5[(1-ethyl-1,2-dihydroquinolinylidene-2)ethylidene]-2(3-carboxymethyl-4-oxo-2-thio-5thiazolidinylidene)-4-thiazolidone (Dye B)

3-Ethyl-5[(1-ethyl-1,2-dihydroquinolinylidene-2)ethylidene] -2-thio-4-thiazolidone (12.8 g) was heated with methyl toluene P-sulphonate (20 g) at 130°C for 4½ hours. Excess ester was then washed away with dry ether. The residue was mixed with a mixture of 3-carboxymethyl-2-thio-thiazolidone (7.3 g), ethanol (250ml) and triethylamine (11.2 ml). After heating under reflux for 15 minutes the mixture was cooled and acidified with acetic acid (11ml). The product separated slowly and was collected on a filter and washed with ethanol and ether. Purification was achieved by first boiling with methanol (300 ml) and then dissolving the residue as the triethylamine salt in ethanol (5 liters) and reprecipitating it with acetic acid. The resulting brilliant green crystals (8.7 g) had a melting point of 241°C, decomposing at 270°C.

EXAMPLE 3

3-n-Heptyl-5[(3-ethyl-2-benzothiazolinylidene) ethylindene] -2 (3-carboxymethyl-4-oxo-2-thio-5-thiazolidinylidene)-4-thiazolidone (Dye C)

3-n-Heptyl-5[(3-ethyl-2-benzothiazolinylidene) ethylidene] -2-thio-4-thiazolidone (26.75 g) was heated with methyl toluene p-sulphonate (35 g) at 140°C for 4 hours. Excess ester was then washed away with dry ether. The residue was mixed with a mixture of 3-carboxymethyl-24-thiazolidone (11.2 g), ethanol (800 ml) and triethylamine (17.9 ml). After heating under reflux for 15 minutes the mixture was cooled slightly and acidified with acetic acid (18 ml) and after standing was filtered. The crude dye (11.8 g) was purified by solution as the triethylamine salt in hot methanol (280 ml) and reprecipitated by the addition of glacial acetic acid as glistening dark green crystals (7.7 g) with a melting point of 265° to 270°C.

EXAMPLE 4

3-n-Heptyl-5[(3-ethyl-2-benzothiazolinylidene)ethylidene]-2(3-carbethoxyethyl-4-oxo-2-thio-5-thiazolidinylidene)-4-thiazolidone The dye from Example 3 (3g) was heated under reflux for 1 hour in ethanol (1 liter) containing acetic acid (2ml) and the triethylamine (25 ml) was added and the mixture was left to stand. On cooling green crystals were deposited and filtered off. Crystallization from benzene (100 ml) gave a green crystalline product (0.5 g) with a melting point of 244° to 245°C.

EXAMPLE 5

3-Ethyl-5[(3-ethyl-2-benzothiazolinylidene)ethylidene]-2(3-carboxymethyl-4-oxo-2-thio-5-thiazolidinylidene)-4-thiazolidone 3-Ethyl-5[(3-ethyl-2-benzothiazolinylidene)ethylidene]-2-thio-4-thiazolidone (2.1g) was heated with methyltoluene p-sulphonate (2.0 g) at 130°C for 4 hours. Excess ester was then washed away with dry ether. The residue was mixed with 3-carboxymethyl-2-thiothiazolid-4-one (1.15 g), ethanol (75 ml) and triethylamine (1.7 ml). After heating under reflux for 15 minutes, the mixture was cooled and, after standing, was filtered. The crude dye (2.0 g) was purified by crystallization as the triethylamine salt in hot methoxyethanol. The product dye was obtained as deep green crystals (1.4 g) with a melting point of 306° to 307°C with decomposition.

EXAMPLE 6

3-n-Heptyl-5[(3-ethyl-2-benzothiazolinylidene)ethylidene]-2(3-ethyl-4-oxo-2-thio-5-thiazolidinylidene)-4-thiazolidone 3-n-Heptyl-5[(3-ethyl-2-benzothiazolinylidene)ethylidene] -2-thio-4-thiazolidone (8.4 g) was heated with methyl toluene p-sulphonate (17.0 g) at 140°C for 5 hours. Excess ester was then washed away with dry ether. The residue was mixed with 3-ethyl-2-thiothiazolid-4-one (3.2 g) ethanol (200 ml) and triethylamine (2.8 ml). After heating under reflux for 15 minutes the mixture was cooled and filtered. The crude dye (5.9 g) was crystallized from benzene (150 ml) and obtained as glistening green crystals with a melting point of 240° to 242°C.

EXAMPLE 7

3-ethyl-5[(3-ethyl-2-benzothiazolinylidene)ethylidene]-2(3-n-heptyl -4-oxo-2-thio-5-thiazolidinylidene)-4-thiazolidone 3-Ethyl-5[(3-ethyl-2-benzothiazolinylidene)ethylidene] -2-thio-4-thiazolidone (1.4 g) was heated with methyl toluene p-sulphonate (2.0 g) at 130°C for 4 hours. Excess ester was then washed away with dry ether. The residue was mixed with 3-n-heptyl-2-thio-thiazolid-4-one (0.92 g), ethanol (50 ml) and triethylamine (0.56 ml). After hearing under reflux for 15 minutes, the mixture was cooled slightly and, after standing, was filtered. The crude dye (0.9 g) was purified by crystallizing from benzene (300 ml). The product dye was obtained as deep magenta crystals (0.6 g) with a melting point of 322° to 323°C.

EXAMPLE 8

3-Carboxymethyl-5[(3-ethyl-2-benzothiazolinylidene)ethylidene]-2 (3-n-heptyl-4-oxo-2-thio-5[(3-ethyl-2-benzothiazolinlyidene) ethylidene]-2-thio-4-thiazolidone (3.6 g) was heated with methyl toluene p-sulphonate (5.0 g) at 130°C for 4 hours. Excess ester was then washed away with dry ether. The residue was mixed with 3-n-heptyl-2-thio-thiazolid-4-one (2.3 g), ethanol (125 ml) and triethylamine (1.4 ml). After heating under reflux for 15 minutes the mixture was cooled and filtered. The crude dye (9.4 g) was twice crystallized from benzene to give a product dye with a melting point of 230° to 235°C.

EXAMPLE 9

3-n-Heptyl-5[(3-ethyl-2-benzothiazolinylidene)ethylidene]-2(3-n-heptyl-4-oxo-2-thio-5-thiazolidinylidene)-4-thiazolidone 3-n-Heptyl-5[(3-ethyl-2-benzothiazolinylidene)ethylidene]-2-thio4-thiazolidone (13.8 g) was heated with methyl toluene p-sulphonate (22.0 g) at 140°C for 4 hours. Excess ester was then washed away with dry ether. The residue was mixed with 3-n-heptyl-2-thio-thiazolid-4-one (7.7g) ethanol (200 ml) and triethylamine (4.7 ml). After heating under reflux for 20 minutes, the mixture was cooled slowly and after standing was filtered. The crude dye was crystallized from a mixture of benzene (100 ml) and cyclohexane (150 ml) to give dark green crystals having a melting point of 195° to 197°C.

EXAMPLE 10

3-Ethyl-5[(5-chloro-3-ethyl-2-benzothiazolinylidene)ethylidene]-2 (3-carboxymethyl-4-oxo-2-thio-5-thiazolidinylidene)-4-thiazolidone (Dye D)

3-Ethyl-5[(5-chloro-3-ethyl-2-benzothiazolinylidene)ethylidene] -2-thio-4-thiazolidone (9.6 g) was heated with methyl toluene P-sulphonate (15.0 g) and xylene (50 ml) at 140°C for 2 hours. Cooled, filtered and washed with dry ether. The residue was mixed with 3-carboxymethyl-24-one (4.9 g), 90 percent aqueous ethanol (350 ml) and triethylamine (7.0 ml). After heating under reflux for 15 minutes, the mixture was cooled slightly, acidified with glacial acetic acid (12.5 ml) and, after standing, was filtered. The crude dye (5.0 g) was purified by solution as the triethylamine salt in hot 90 percent aqueous ethanol (1500 ml) and reprecipitated by the addition of glacial acetic acid, as deep green crystals (3.7 g) with a melting point of 230°C.

EXAMPLE 11

3-Ethyl-5[(5-chloro-3-ethyl-2-benzothiazolinylidene)ethylidene]-2(3-ethyl-4-oxo-2-thio-5-thiazolidinylidene)-4-thiazolidone 3-Ethyl-5[(5-chloro-3-ethyl-2-benzothiazolinylidene) ethylidene]-2-thio-4-thiazolidone (3.8 g) was heated with methyl toluene p-sulphonate (5.0 g) at 140°C for 3 hours. Excess ester was then washed away with dry ether. The residue was mixed with 3-ethyl-2-thio-thiazolid-4-one (1.6 g), ethanol (250 ml) and triethylamine (1.4 ml). After heating under reflux for 15 minutes the mixture was cooled slightly and filtered. The crude dye (2.2 g) was purified by crystallization from benzene to give magenta microcrystals with a melting point of 330°C.

EXAMPLE 12

3-Ethyl-5[(5-chloro-3-ethyl-benzothiazolinylidene)ethylidene] -2(3-n-heptyl-4-oxo-2-thio-5- thiazolidinylidene)-4-thiazolidone

3-Ethyl-5[(5-chloro-3-ethyl-2-benzothiazolinylidene) ethylidene]-2-thio-4-thiazolidone (3.1 g) was heated with methyl toluene p-sulphonate (5.0 g) at 140°C for 3 hours. Excess ester was then washed away with dry ether. The residue was mixed with 3-n-heptyl-2-thio-thiazolid-4-one (1.85 g) ethanol (100 ml) and triethylamine (1.1 ml). After heating under reflux for 15 minutes, the mixture was cooled slightly and filtered. The crude dye (1.6 g) was purified by boiling with benzene to leave a magenta solid (0.6 g) with a melting point of 270°C.

EXAMPLE 13

3-Ethyl-5[(1-ethyl-1,2-dihydroquinolinylidene-2)ethylidene]-2 (3-carboxy-pentyl-4-oxo-2-thio-5-thiazolidinylidene)-4-thiazolidone 3-Ethyl-5[(1-ethyl-1,2-dihydroquinolinylidene-2)ethylidene]-2-thio-4-thiazolidone (3.4 g) was heated with methyl toluene p-sulphonate (4 g) at 140°C for 4 hours. Excess ester was washed away with dry ether. The residue was mixed with 3-carboxypentyl-2-thio-thiazolid-4-one (2.4 g) and pyridine (30 ml) and heated at 100°C for 1 hour. The crude dye (3.4 g) was filtered off after cooling and purified by solution in hot 90 percent aqueous ethanol as the triethylamine salt and acidifying to pH 3 with concentrated hydrochloric acid at 0°C. The resulting precipitated dye was obtained as deep green plates (2.4 g) with a melting point of 293° to 295°C.

EXAMPLE 14

3-Ethyl-5[(3-ethyl-2-benzothiazolinylidene)ethylidene]-2[2(3 ethyl-4-oxo-2-thio-5-thiazolidinylidene)-2-methyl-ethylidene]-4-thiazolidone 3-Ethyl-5[(3-ethyl-2-benzothiazoinylidene)ethylidene]-2-thio-4-thiazolidone (3.65 g) was heated with methyl toluene p-sulphonate (6.0 g) at 130°C for 3 hours. Excess ester was then washed away with dry ether. The residue was mixed with 3-ethyl-2-thio-5-isopropylidene-thiazolid-4-one (2.0 g), ethanol (125 ml) and triethylamine (1.4 ml). After heating under reflux for 15 minutes the mixture was cooled and the crude dye (2.7 g) was filtered off. Crystallization from benzene (100 ml) gave the product dye as brilliant green crystals (1.4 g) with a melting point of 299°C.

EXAMPLE 15

3-Ethyl-5[(1-ethyl-1,2-dihydroquinolinylidene-2)ethylidene]-2 (3-n-heptyl-4-oxo-2-thio-5-thiazolidinylidene)-4-thiazolidone 3-Ethyl-5[(1-ethyl-1,2-dihydroquinolinylidene-2)ethylidene]-2-thio-4-thiazolidone (4.1 g) was heated with methyl toluene p-sulphonate (8.0 g) at 130°C for 130 hours. Excess ester was washed away with dry ether. The residue was mixed with 3-n-heptyl-2-thio-thiazolid-4-one (2.8 g), ethanol (150 ml) and triethylamine (1.7 ml) and heated under reflux for 15 minutes. The crude dye (3.5 g) was filtered off after cooling and crystallized from benzene (15C ml) to give the product dye as bright green crystals (1.9 g) with a melting point of 228°C.

EXAMPLE 16

3-Ethyl-5[(1-ethyl-1,2-dihydroquinolinylidene-2)ethylidene]-2(3,3'-diallyl-4,6-dioxo-2-thio-5-hexahydropyrimidinylidene)-4-thiazolidone 3-Ethyl-5[(1-ethyl-1,2-dihydroquinilinylidene-2)ethylidene]-2-thio-4-thiazolidone (3.4 g) was heated with methyl p-toluene p-sulphonate (8.0 g) at 140°C for 4 hours. Excess ester was washed away with dry ether and the residue mixed with 1,3-diallyl-2-thio-barbituric acid (2.8 g), ethanol (125 ml) and triethylamine (1.4 ml). After heating under reflux for 15 minutes the mixture was cooled and the product filtered off. The crude material was crystallized from benzene to give 1.2 g of dye with a melting point of 261°C.

EXAMPLE 17

3-n-Heptyl-5[(3-ethyl-2-β-naphthathiazolinylidene)ethylidene]-2(3-carboxymethyl-4-oxo-2-thio-5-thiazolidinylidene)-4-thiazolidone 3-n-Heptyl-5[(3-ethyl-2-β-naphthathiazolinylidene) ethylidene]-2(3-carboxymethyl-4-oxo-2-thio-5-thiazolidinylidene (4.7 g) was heated with dry oxylene (16 ml) and methyl toluene p-sulphonate (6.0 g) at 140°C for 2 hours. The mixture was filtered and the solids washed with dry ether. The residue was mixed with 3-carboxymethyl-2-thio-4-thiazolidone (1.9 g) and dry pyridine (25 ml). After heating under reflux for 15 minutes the mixture was cooled and poured in 90 percent aqueous ethanol (75 ml). After acidifying with glacial acetic acid (25 ml) the product was filtered off. The crude dye (5.6 g) was purified by solution in 90 percent aqueous ethanol (850 ml) as the triethylamine salt and precipitated by the addition of glacial acetic acid to give dark green crystals (3.9 g) with a melting point of 298°C.

EXAMPLE 18

3-n-Heptyl-5[(3-ethyl-2-benzothiazolinylidene)ethylidene]-2(1,3-dimethyl-4-oxo-2-thio-5-iminazolidinylidene)-4-thiazolidone 3-n-Heptyl-5[(3-ethyl-2-benzothiazolinylidene) ethylidene]-2-thio-4-thiazolidone (4.2 g) was heated with dry xylene (10 ml) and methyl toluene p-sulphonate (6.0 g) at 140°C for 2 hours. The mixture was then cooled filtered and the solids washed with dry ether. The residue was mixed with 1,3-dimethyl-2-thio-hydantoin (1.4 g), ethanol (20 ml) and triethylamine (1.4 ml) and heated under reflux for 20 minutes. The dye was filtered from the cooled reaction mixture and purified by boiling with ethanol (200 ml) to leave the product dye as dark green crystals (1.0 g) with a melting point of 184°C.

EXAMPLE 19

3-n-Heptyl-5[(3-ethyl-2-benzothiazolinylidene)ethylidene]-2(4-oxo-2-thio-5-thiazolidinylidene)4-thiazolidone 3-n-Heptyl-5[(3-ethyl-2-benzothiazolinylidene)ethylidene]-2-thio-4-thiazolidone (2.1 g) was heated with dry xylene (10 ml) and methyl toluene p-sulphonate (3.0 g) at 140°C for 2 hours. The mixture was filtered and the solids washed with dry ether. The residue was then mixed with 2-thio-thiazolid-4-one (0.67 g), ethanol (30 ml) and triethylamine (0.7 ml). After heating under reflux for 10 minutes, the mixture was cooled and the product removed by filtration. After washing well with ethanol, the dye remained as bright green plates with a melting point of 263°C.

EXAMPLE 20

3-n-Heptyl-5[(3-n-heptyl-2-benzothiazolinylidene)ethylidene]-2(4-oxo-2-thio-5-thiazolidinylidene)-4-thiazolidone 3-n-Heptyl-5[(3-n-heptyl-2-benzothiazolinylidene)ethylidene]-2-thio-4-thiazolidone (2.4 g) was heated with dry xylene (10 ml) and methyl toluene p-sulphonate (3.0 g) at 140°C for 2 hours. The mixture was filtered and the solids washed with dry ether. The residue was mixed with 2-thio-thiazolid-4-one (0.67 g), ethanol (30 ml) and triethylamine (0.7 ml). After heating under reflux for 10 minutes, the mixture was cooled and the dye removed by filtration. The crude dye (0.9 g) was dissolved in chloroform and drowned into methanol to give bright green crystals (0.6 g) having a melting point of 277°C.

EXAMPLE 21

3-n-Heptyl-5[(3-ethyl-2-benzothiazolinylidene)ethylidene]-2(3-ethyl-4-oxo-2-thio-5-oxazolidinylidene)-4-thiazolidone 3-n-Heptyl-5[(3-ethyl-2-benzothiazolinylidene)ethylidene]-2-thio-4-thiazolidone (4.2 g) was heated with dry xylene (20 and methyl toluene p-sulphonate (6.0 g) at 140°C for 1½ hours. The resulting mixture was filtered and the solids washed with dry ether. The residue was mixed with 3-ethyl-2-thio-oxazolid-4-one (1.6 g), ethanol (30 ml) and triethylamine (1.4 ml). After heating under reflux for 20 minutes the reaction mixture was cooled and the crude product (0.6 g) filtered off. Purification was obtained by solution in chloroform and drowning into methanol. The resulting magenta colored crystals (0.4 g) had a melting point of 253°C.

EXAMPLE 22

3-Carboxymethyl-5(3-ethyl-2-benzothiazolinylidene)-2(3-carboxymethyl-4-oxo-2-thio-5-thiazolidinylidene)-4-thiazolidone 3-Carboxymethyl-5(3-ethyl-2-benzothiazolinylidene)-2-thio-4-thiazolidone (7.0 g) was heated with dry xylene (25 ml) and methyl toluene p-sulphonate (12.0 g) at 140°C for 4 hours. The mixture was filtered and the solids washed with dry ether. The residue was mixed with a mixture of 3-carboxymethyl-2-thiothiazolid-4-one (3.8 g), 90 percent aqueous ethanol (50 ml) and triethylamine (10.0 ml). After heating under reflux for 15 minutes the mixture was cooled slightly and acidified wit glacial acetic acid (25 ml) and after standing was filtered. The crude dye (3.0 g) was purified by solution as the triethylamine salt in hot 90 percent aqueous ethanol (400 ml) and reprecipitated by the addition of glacial acetic acid, as orange red crystals (1.5 g) having a melting point of 270°C.

EXAMPLE 23

3-Ethyl-5[(3-ethyl-6-methyl-2-benzothiazolinylidene)ethylidene]-2(3-carboxymethyl-4-oxo-2-thio-5-thiazolidinylidene)-4-thiazolidone 3-Ethyl-5[(3-ethyl-6-methyl-2-benzothiazolinylidene) ethylidene]-2-thio-4-thiazolidone (3.6 g) was heated with dry xylene (10 ml) and methyl toluene p-sulphonate (6.7 g) at 140°C for 2 hours. The mixture was filtered and the solids washed with dry ether. The residue was mixed with 3-carboxymethyl-2-thiothiazolid-4-one (2.0 g) and pyridine (20 ml). After heating under reflux for 20 minutes, the mixture was cooled and filtered to obtain the crude product which was then purified by solution in hot 90 percent aqueous ethanol (250 ml) as the triethylamine salt and precipitated by the addition of excess glacial acetate acid. The product dye (0.9 g) was obtained as deep green crystals with a melting point of 305°C.

EXAMPLE 24

3-n-Heptyl-5[(3-ethyl-2-benzothiazolinylidene)isopropylidene]-2(3-carboxymethyl-4-oxo-2-thio-5-thiazolidinylidene)-4-thiazolidone 3-n-Heptyl-5[(3-ethyl-2-benzothiazolinylidene)isopropylidene]-2-thio-4-thiazolidone (4.0 g) was heated with dry xylene (10 ml) and methyl toluene p-sulphonate (7.0 g ) at 140°C for 2 hours. The mixture was then filtered and the solids washed with dry ether. The solids were mixed with 3-carboxymethyl-2-thiothiazolid-4-one (2.0 g) and pyridine (30 ml). After heating under reflux for 20 minutes the mixture was cooled and filtered to obtain the crude product which was then purified by solution in hot 90 percent aqueous ethanol as the triethylamine salt and precipitated by the addition of an excess of glacial acetic acid. The product dye (1.6 g) was obtained as dark magenta crystals with a melting point of 277°C.

EXAMPLE 25

3-Ethyl-5[(1-ethyl-1,2-dihydroquinolinylidene-2)ethylidene]-2(3-ethyl-4-oxo-2-thio-5-thiazolidinylidene)-4-thiazolidone 3-Ethyl-5[(1-ethyl-1,2-dihydroquinolinyldiene-2)ethylidene]-2-thio-4-thiazolidone (4.2 g) was heated wit methyl toluene p-sulphonate (8.0 g) at 130°C for 4 hours, then excess ester was washed away with dry ether. The residue was mixed with 3-ethyl-2-thiothiazolid-4-one (2.0 g), ethanol (150 ml) and triethylamine (1.7 ml) and heated under reflux for 15 minutes. The crude dye (2.0 g) was filtered off after cooking and crystallized from benzene (1,800 ml) to give the dye as deep green plates (1.6 g) with a melting point of 315° to 319°C.

EXAMPLE 26

3-Ethyl-5[(1-ethyl-1,4-dihydroquinolinylidene-4)ethylidene]-2(3-ethyl-4-oxo-2-thio-5-thiazolidinylidene)-4-thiazolidone 3-Ethyl-5[(1-ethyl-1,4-dihydroquinolinylidene-4) ethylidene]-2-thio-4-thiazolidone (7.5 g) was heated with methyl toluene p-sulphonate (15.0 g) at 130°C for 4 hours. Then excess ester was washed away with dry ether. The residue was mixed with 3-ethyl-2-thiothiazolid-4-one (3.5 g), ethanol (250 ml) and triethylamine (3.1 ml) and heated under reflux for 15 minutes. The crude dye (4.6 g) was filtered off after cooling and crystallized from benzene (4,500 ml) to give the dye as dark green crystals (2.6 g) with a gold reflex, and with a melting point of 303+ to 305+ C.

EXAMPLE 27

2-Ethyl-5[(1-ethyl-1,4-dihydroquinolinylidene-4)ethylidene]-2(3-carboxymethyl-4-oxo-2-thio-5-thiazolidinylidene)-4-thiazolidone 3-Ethyl-5[(1-ethyl-1,4-dihydroquinolinylidene-4)ethylidene]-2-thio-4-thiazolidone (8.6 g) was heated with methyl toluene p-sulphonate (14 g) and dry xylene (50 ml) at 140°C for 2 hours. The mixture was then filtered and the residue washed with dry ether. The residue was next mixed with a mixture of 3-carboxymethyl-2-thio-thiazolidone (4.8 g), 90 percent ethanol (50 ml) and triethylamine (7 ml). After heating under reflux for 20 minutes the mixture was cooled and acidified with acetic acid (7 ml) The product dye separated and was collected on a filter and washed with ethanol and ether. Purification was achieved by dissolving the crude dye as the triethylamine salt in 90 percent ethanol (1 liter and reprecipitating it with hydrochloric acid. The resulting brilliant green crystals (2.5 g) had a melting point of 303°C.

EXAMPLE 28

3-n-Heptyl-5[(1ethyl-1,2-dihydroquinolinylidene-2)ethylidene]-2(4-oxo-2-thio-5-thiazolidinylidene)-4-thiazolidone 3n-Heptyl-5[(1-ethyl-1,2-dihydroquinolinylidene-2)ethylidene]-2thio-4-thiazolidone (2.1 g) was heated with dry xylene (10 ml) and methyl toluene p-sulphonate (3.0 g) at 140°C for 2 hours. The mixture was filtered and the solids washed with dry ether. The solids were then mixed with 2-thio-thiazolid-4-one (0.67 g), ethanol (30 ml) and triethylamine (0.7 ml). After heating under reflux for 10 minutes, the mixture was cooled and the product removed by filtration. After washing well with ethanol, the crude dye (1.5 g) was dissolved in chloroform and precipitated with methanol as green plates (0.8 g) with a melting point of 283°C.

EXAMPLE 29

3-Ethyl-5[(1-ethyl-1,2-dihydroquinolinylidene-2)ethylidene]-2(4-oxo-2-thio-5-thiazolidinylidene)-4-thiazolidone 3-Ethyl-5[(1-ethyl-1,2-dihydroquinolinylidene-2)ethylidene]-2-thio-4-thiazolidone (1.7 g) was heated with dry xylene (10 ml) and methyl toluene p-sulphonate (3.0 g) at 140°C for 2 hours. The mixture was filtered and the solids washed with dry ether. Then the solids were mixed with 2-thiothiazolid-4-one (0.67 g), ethanol (30 ml) and triethylamine (0.7 ml). After heating under reflux for 20 minutes, the mixture was cooled and the product removed by filtration. After washing well with ethanol, the dye remained as bright green plates

EXAMPLE 30

3-Ethyl-5[(3-ethyl-2-benzoxazolinylidene)ethylidene]-2(3-n-heptyl-4-oxo-2-thio-5-thiazolidinylidene)-4-thiazolidone 3-Ethyl-5[(3-ethyl-2-benzoxazolinylidene)ethylidene]-2-thio-4-thiazolidone (3.3 g) was heated with methyl toluene p-sulphonate (4.0 g) at 140°C for 3 hours. Excess ester was then was washed away with dry ether. The residue was mixed with 3-n-heptyl-2-thiothiazolid-4-one (2.3 g), ethanol (50 ml) and triethylamine. After being heated under reflux for 20 minutes, the mixture was cooled and filtered. The residue of crude dye (3.4 g) was crystallized from benzene (350 ml) to yield a magenta colored product with a melting point of 298° to 300°C.

EXAMPLE 31

3-n-Heptyl-5[(3-ethyl-2-benzoxazolinylidene)ethylidene]-2(3-n-heptyl-4-oxo-2-thio-5-thiazolidinylidene)-4-thiazolidone 3-n-Heptyl-5[(3-ethyl-2-benzoxazolinylidene)ethylidene]-2-thio-4-thiazolidone (4.0 g) was heated with methyl toluene p-sulphonate (4.0 g) at 135°C for 3 hours. Excess ester was then washed away with dry ether. The residue was mixed with 3-n-heptyl-2-thiothiazolid-4-one (2.3 g) ethanol (50 ml) and triethylamine (1.4 ml). After heating under reflux for 20 minutes, the reaction mixture was cooled and the crude dye (4.3 g) removed by filtration. Crystallization from 200 ml of a mixture (1:2) of benzene and cyclohexane gave the product dye (1.65 g) with a melting point of 185° to 189°C.

EXAMPLE 32

3-n-Heptyl-5[(3-ethyl-2-benzoxazolinylidene)ethylidene]-2(4-oxo-2-thio-5-thiazolidinylidene)-4-thiazolidone 3-n-Heptyl-5[(3-ethyl-2-benzoxazolinylidene)ethylidene]-2-thio-4-thiazolidone (2.0 g) was heated with dry xylene (10 ml) and methyl toluene p-sulphonate (3.0 g) at 140°C for 2 hours. The mixture was then filtered and the solids washed with dry ether. The solids were mixed with 2-thio-thiazolid-4-one (0.67 g), ethanol (30 ml) and triethylamine (0.7 ml). After heating under reflux for 20 minutes the mixture was cooled and filtered. The residue of crude dye (1.3 g) was purified by solution in chloroform and dilution with methanol. The resulting bright green crystals (0.75 g) had a melting point of 299°C.

EXAMPLE 33

3-Ethyl-5[(3-ethyl-2-benzoxazolinylidene)ethylidene]-2-(3-carboxymethyl-4-oxo-2-thio-5-thiazolidinylidene)-4-thiazolidone 3-Ethyl-5[(3-ethyl-2-benzoxazolinylidene)ethylidene]-2-thio-4-thiazolidone (3.3 g) was heated with methyl toluene p-sulphonate (4.0 g) at 135°C for 3 hours. Excess ester was then washed away with dry ether. The residue was mixed with 3-carboxymethyl-2-thio-thiazolid-4-one (1.9 g), 90 percent aqueous ethanol (50 ml) and triethylamine (2.8 ml). After heating under reflux for 15 minutes, the mixture was cooled and filtered. The crude dye (3.5 g) was purified by solution as the triethylamine salt in hot 90 percent aqueous ethanol (440 ml) and reprecipitated by the addition of glacial acetic acid, as bright green plates (2.5 g) with a melting point of 314° to 315°C.

EXAMPLE 34

3-Ethyl-5[(5-acetamido-3-methyl-2-benzoxazolinylidene)ethylidene]-2(3-ethyl-4-oxo-2-thio-5-thiazolidinylidene)-4-thiazolidone 3-Ethyl-5[(5-acetamido-3-methyl-2-benzoxazolinylidene)ethylidene]-2-thio-4-thiazolidone (0.9 g) was heated with dry xylene (4ml) and methyl toluene p-sulphonate (1.5 g) at 140°C for 2½ hours. The mixture was filtered and then the solids washed with dry ether. Then the solids were mixed with 3-ethyl-2-thio-thiazolid-4-one (0.4 g), ethanol (15 ml) and triethylamine (0.4 ml). After heating under reflux for 15 minutes the mixture was cooled and filtered. The crude dye (0.75 g) was purified by boiling with ethanol (25 ml) to give dark green crystals with a melting point of 308° to 310°C (with decomposition).

EXAMPLE 35

3-n-Heptyl-5[(6-ethoxy-3-ethyl-2-benzoxazolinylidene)ethylidene]-2(3-carboxymethyl-4-oxo-2-thio-5-thiazolidinylidene)-4-thiazolidone 3-n-Heptyl-5[(6-ethoxy-3-ethyl-2-benzoxazolinylidene)ethylidene]-2-thio-4-thiazolidone (17.7 g) was heated with dry xylene (75 ml) and methyl toluene p-sulphonate (18.0 g) at 140°C for 4 hours. The mixture was cooled, filtered and the solids washed with dry ether. Then the solids were mixed with 3-carboxymethyl-2-thio-thiazolid-4-one (10 g) and pyridine (70 ml) and heated under reflux for 15 minutes. The mixture was cooled and poured into 90 percent aqueous ethanol (300 ml) and acidified with glacial acetic acid (65 ml). After standing the crude dye was filtered off and purified by solution in 90 percent aqueous ethanol as the triethylamine salt followed by precipitation with glacial acetic acid. The product dye (13.4 g) formed dark green crystals with a melting point of 291°C.

EXAMPLE 36

3-Ethyl-5[(1-acetoxyethyl-5,6-dichloro-3-ethyl-2-benzimidazolinylidene)ethylidene]-2(3-carboxymethyl-4-oxo-2-thio-5-thiazolidinylidene)-4-thiazolidone 3-Ethyl-5[(1-acetoxyethyl-5,6-dichloro-3-ethyl-2-benzimidazolinylidene)ethylidene]-2-thio-4-thiazolidone (2.0 g) was heated with dry xylene (20 ml) and methyl toluene p-sulphonate (4.0 g) at 140°C for 2 hours. The mixture was filtered and the solids washed with dry ether. The residue was mixed with 3-carboxymethyl-2-thio-4-thiazolidone (0.75 g) and dry pyridine (20 ml). After heating under reflux for 15 minutes the mixture was cooled and poured into 90 percent aqueous ethanol (200 ml). The crude dye was purified by solution in hot 90 percent aqueous ethanol (200 ml) as the triethylamine salt and precipitated by the addition of glacial acetic acid to give the product (1.0 g) with a melting point of 282°C.

EXAMPLE 37

3-Ethyl-5[(1,3,3-trimethyl-2-indoleninylidene)ethylidene]-2(3-carboxy-methyl-4-oxo-2-thio-5-thiazolidinylidene)-4-thiazolidone 3-Ethyl-5[(1,3,3-trimethyl-2-idoleninylidene)ethylidene]-2-thio-4-thiazolidone (3.4 g) was heated with dry xylene (30 ml) and methyl toluene p-sulphonate (6.0 g) at 140°C for 2 hours. The mixture was filtered and the solids washed with dry ether. The solids were then mixed with 3-carboxymethyl-2-thio-4-thiazolidone (1.9g) and dry pyridine (20 ml). After heating under reflux for 15 minutes the mixture was cooled and poured into 90 percent aqueous ethanol (200ml). After filtration the crude dye was purified by solution in 90 percent aqueous ethanol (200 ml) as the triethylamine salt and precipitated by the addition of glacial acetic acid to give the product dye (1.0g) with a melting point of 285°C.

EXAMPLE 38

3-n-Heptyl-5[(3-ethyl-5-methyl-2-benzoselenazolinylidene)ethylidene]-2(3-carboxymethyl-4-oxo-2-thio-5-thiazolidinylidene-4-thiazolidone 3-n-Heptyl-5[(3-ethyl-5-methyl-benzoselenazolinylidene)ethylidene]-2-thio-4-thiazolidone (1.9g) was heated with methyl toluene p-sulphonate (4.0g) at 140°C for 2 hours and the resulting mixture was then cooled and washed with dry ether. The residue was mixed with 3-carboxymethyl-2-thio-thiazolid-4-one (0.77g) and pyridine (20ml) and heated under reflux for 15 minutes. After this, the mixture was cooled and poured into 90 percent aqueous ethanol (200 ml). After standing, the crude dye was filtered off and purified by solution in 90 percent aqueous ethanol as the triethylamine salt followed by precipitation with glacial acetic acid.

The desired product (1.4g) formed dark green crystals having a melting point of 291°C.

EXAMPLE 39

A dry silver light-sensitive material was prepared by first dispersing silver behenate (67 g) in a methyl ethyl ketone-toluene mixture (1:1 by weight) so as to give a 15 percent by weight solids suspension. The dispersion was effected by ball-milling for 24 hours. Then 20 ml of a 2 percent solution of $HgBr_2$ in methanol was added to form some silver bromide in the mixture. After the addition of the $HgBr_2$ solution, the now light-sensitive mixture was allowed to digest for 1 hour in safe light.

Next, a 15 percent solution (67 g) of polyvinyl butyral (Butvar B–76) in methyl ethyl ketone and 1-pthalazone (0.7 g) were added and the resulting suspension ball milled for 3 hours. Thereafter, the reducing agent Nonox WSO (5.0 g) and a 0.1 percent solution (10 ml) of the Dye as prepared in Example 1 in chloroform were added and the final suspension was agitated for 102 minutes.

The suspension was then wet coated to 4 mil wet thickness on a polyester film base. The coating was allowed to air dry for 2 hours giving a light-sensitive material.

After exposure of the light-sensitive material to a light image, it was developed by heating for 10 seconds at 134°C to give a good negative reproduction of the light image, the developed material having a low fog and reasonable speed. The exact value for the speed was measured with respect to the speed obtained with an excellent known green control dye of the following structure:

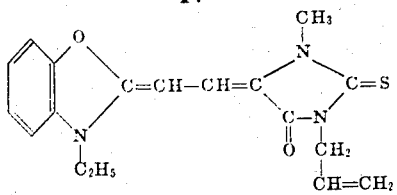

Additionally the wavelength of maximum sensitivity of the light-sensitive material was also measured.

This procedure was then repeated using, in place of the dye prepared in Example 1, each of the dyes as prepared in Examples 2 to 29. Similar results were achieved.

For comparison, the procedure was also repeated without any dye whatsoever.

All of the results obtained are shown in the following Table.

| Dye used (Ex. No.) | Wavelength of maximum sensitivity ($\lambda$ max; nm$\lambda$) | Relative log speed to the standard measured at the respective $\lambda$ max, white light exposure. |
|---|---|---|
| No dye | 450 | −1.25 |
| Control | 525 | 0 |
| 1 | 650 | 0.60 |
| 2 | 700 | 0.60 |
| 3 | 625 | 1.05 |
| 4 | 625 | 0.45 |
| 5 | 700 | 0.15 |
| 6 | 600 | 0.30 |
| 7 | 610 | 0.60 |
| 8 | 600 | 0.60 |
| 9 | 625 | 0.15 |
| 10 | 590 | 1.20 |
| 11 | 600 | 0.30 |
| 12 | 600 | 0 |
| 13 | 630 | 0.60 |
| 14 | 700 | −0.15 |
| 15 | 650 | 0.30 |
| 16 | 600 | 0.30 |
| 25 | 700 | 0.15 |
| 26 | 680 | 0.90 |
| 27 | 660 | 0.30 |
| 28 | 645 | 0.30 |
| 29 | 650 | 0.30 |

As can be seen the incorporation of the known control dye in the light-sensitive compositions gives a large increase in speed, but the speed of the compositions of the invention is generally much faster and the wavelength of maximum sensitivity is at much longer wavelengths (in the region of yellow to red instead of in the green region) in comparison with the known dye.

What is claimed is:

1. A light-sensitive composition comprising an intimate mixture of a substantially light-insensitive silver salt of an organic acid which upon reduction gives a visible change and sufficient of a silver halide to catalyze this reduction to give a visible change in those areas where the silver halide has been exposed to light and the mixture is heated in the presence of a reducing agent for said light-insensitive silver salt, said mixture further including a merocyanine tri-nuclear dye having the general formula:

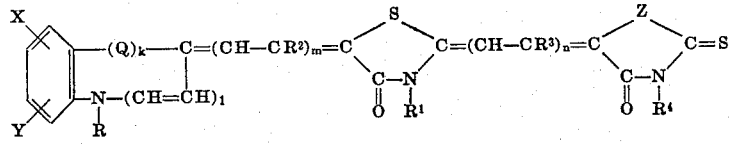

in which $k$ and $l$ are each 0 or 1 with proviso that, when $k$ is 0, $l$ is 1 and when $k$ is 1, $l$ is 0; Q represents —S—, —Se—, —CH=CH—,

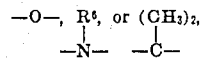

where $R^6$ represents a lower alkyl group or a lower alkyl group containing an ester group; $m$ and $n$ are each 0 or 1, R represents an alkyl, hydroxyalkyl, carboxyalkyl or sulfo-alkyl group, $R^1$ represents an aryl or aralkyl group or any of the groupings represented by R; $R^2$ and $R^3$ each independently represents a hydrogen atom or a lower alkyl group, X and Y each independently represents a hydrogen or halogen atom or a lower alkyl, alkoxy, aryl, amino or acylamino group or together represent a divalent methylene dioxy group or the carbon atoms required to form a fused on carbon ring, and Z represents

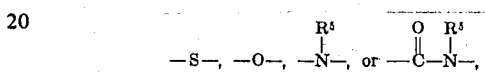

in which $R^4$ and $R^5$ each independently represents a hydrogen atom or any of the groupings represented by $R^1$ including the groupings $R^7$COOH and $R^7$SO$_3$H wherein $R^7$ represents a lower alkylene group.

2. The composition of claim 1 wherein Q represents —S—, —SE— or —CH=CH—, Z represents —S—,

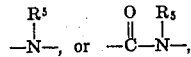

and $R^4$ and $R^5$ each independently represents any of the groupings represented by $R^1$ including the groups $R^7$COOH and $R^7$SO$_3$H where $R^7$ represents a lower alkylene group.

3. The composition of claim 1 wherein said merocyanine dye is 3-ethyl-5[(3-ethyl-2-benzothiazolinylidene)ethylidene]-2(3-ethyl-4-oxo-2-thio-5-thiazolidinylidene)-4-thiazolidone.

4. The composition of claim 1 wherein said merocyanine dye is 3-ethyl-5[(1-ethyl-1,2-dihydroquinolinylidene-2)ethylidene]-2(3-carboxymethyl-4-oxo-2-thio-5-thiazolidinylidene)-4-thiazolidone.

5. The composition of claim 1 wherein said merocyanine dye is 3-n-heptyl-5[(3-ethyl-2-benzothiazolinylidene)ethylidene]-2(3-carboxymethyl-4-oxo-2-thio-5-thiazolidinylidene)-4-thiazolidone.

6. The composition of claim 1 wherein said merocyanine dye is 3-ethyl-5[(5-chloro-3-ethyl-2-benzothiazolinylidene)ethylidene]-2(3-carboxymethyl-4-oxo-2-thio-5-thiazolidinylidene)-4-thiazolidone.

7. The composition of claim 1 containing from 0.01 to 2.0 g of said merocyanine dye per gram mole of total silver in the composition.

8. The composition of claim 7 containing from 0.4 to 1.0 g of the merocyanine dye per gram mole of total silver in the composition.

9. The composition of claim 1 wherein said silver halide is present in an amount of from 0.1 to 10 percent by weight of the mixture of silver compounds.

10. The composition of claim 1 additionally comprising a reducing agent for said light-insensitive silver compound.

11. A sheet-like, light-sensitive recording element comprising a support bearing at least one light-sensitive layer comprising, in intimate mixture,
a. a light-insensitive silver salt of an organic acid

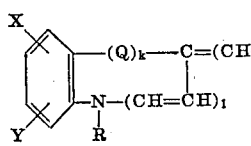

which upon reduction undergoes visible change,
b. silver halide in an amount sufficient to catalyze the reduction of said light-insensitive silver compound after exposure of said element to a light image and upon heating of the element in the presence of a reducing agent for said light-insensitive silver compound, and
c. a tri-nuclear merocyanine dye of the formula

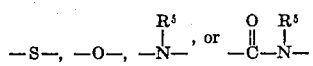

in which k and l are each 0 or 1 with the proviso that, when k is 0, l is 1 and when k is 1, l is 0; Q represents —S—, —Se—, —CH=CH—, —O—,

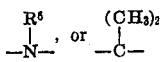

where $R^6$ represents a lower alkyl group or a lower alkyl group containing an ester group; m and n are each 0 or 1, R represents an alkyl, hydroxyalkyl, carboxyalkyl or sulfo-alkyl group, $R^1$ represents an aryl or aralkyl group or any of the groupings represented by R; $R^2$ and $R^3$ each independently represents a hydrogen atom or a lower alkyl group, X and Y each independently represents a hydrogen or halogen atom or a lower alkyl, alkoxy, aryl, amino or acylamino group or together represent a divalent methylene dioxy group or the carbon atoms required to form a fused on carbon ring, and Z represents $$-S-, -O-, -\overset{R^5}{\underset{|}{N}}-, \text{ or } -\overset{O}{\overset{\|}{C}}-\overset{R^5}{\underset{|}{N}}-$$

in which $R^4$ and $R^5$ each independently represents a hydrogen atom or any of the groupings represented by $R^1$ including the groupings $R^7COOH$ and $R^7SO_3H$ where $R^7$ represents a lower alkylene group.

12. The recording element of claim 11 additionally including a layer containing a reducing agent for said light-insensitive silver salt in contact with said light-sensitive layer.

13. A sheet-like, light-sensitive recording element comprising a support bearing at least one light-sensitive layer comprising a mixture of a substantially light-insensitive silver salt of an organic acid which upon reduction gives a visible change and sufficient of a silver halide to catalyze said reduction in those areas where said silver halide has been exposed to light and the mixture heated in the presence of a reducing agent for said light-insensitive silver salt, said mixture further including a merocyanine dye of the formula:

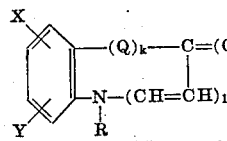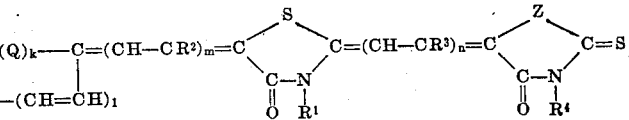

in which k and l are each 0 or 1 with the proviso that, when k is 0, l is 1 and when k is 1, l is 0; Q represents —S—, —Se—, —CH=CH—, —O—,

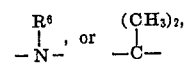

where $R^6$ represents a lower alkyl group or a lower alkyl group containing an ester group; m and n are each 0 or 1, R represents an alkyl, hydroxyalkyl, carboxyalkyl or sulfo-alkyl group, $R^1$ represents an aryl or aralkyl group or any of the groupings represented by R; $R^2$ and $R^3$ each independently represents a hydrogen atom or a lower alkyl group, X and Y each independently represents a hydrogen or halogen atom or a lower alkyl, alkoxy, aryl, amino or acylamino group or together represent a divalent methylene dioxy group or the carbon atoms required to form a fused on carbon ring, and Z represents

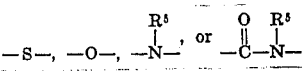

in which $R^4$ and $R^5$ each independently represents a hydrogen atom or any of the groupings represented by $R^1$ including the groupings $R^7COOH$ and $R^7SO_3H$ wherein $R^7$ represents a lower alkylene group.

14. A sheet-like, light-sensitive recording element comprising a support bearing at least one light-sensitive layer comprising, in intimate mixture,
a. a substantially light-insensitive silver salt of an organic acid which upon reduction gives a visible change,
b. silver halide in an amount sufficient to catalyze the reduction of said light-insensitive silver salt after exposure of said element to a light image and upon heating of the element in the presence of a reducing agent for said light-insensitive silver salt, and
c. a tri-nuclear merocyanine dye of the formula

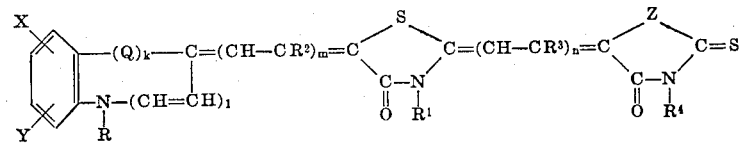

in which k and l are each 0 or 1 with the proviso that, when k is 0, l is 1 and when k is 1, l is 0; Q represents —S—, —Se—, —CH=CH—, —O—,

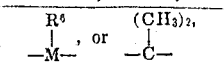

where $R^6$ represents a lower alkyl group or a lower alkyl group containing an ester group; m and n are each 0 or 1, R represents an alkyl, hydroxyalkyl, carboxyalkyl or sulfo-alkyl group, $R^1$ represents an aryl or aralkyl group or any of the groupings represented by R; $R^2$ and $R^3$ each independently represents a hydrogen atom or a lower alkyl group, X and Y each independently represents a hydrogen or halogen atom or a lower alkyl, alkoxy, aryl, amino or acylamino group or together represent a divalent methylene dioxy group or the carbon atoms required to form a fused on carbon ring, and Z represents

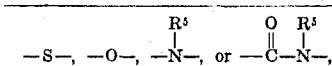

in which $R^4$ and $R^5$ each independently represents a hydrogen atom or any of the groupings represented by $R^1$ including the groupings $R^7COOH$ and $R^7SO_3H$ wherein $R^7$ represents a lower alkylene group, with the proviso that $R^4$ and $R^5$ or both $R^4$ and $R^5$ represent the grouping —$R^7COOH$ or —$R^7SO_3H$.

15. The recording element according to claim 14 wherein, in said merocyanine dye, Q represents —S—, —Se—, or —CH=CH—, and Z represents —S—,

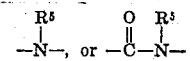

16. The recording element according to claim 14 wherein said merocyanine dye is 3-Ethyl-5[(1-ethyl-1,2-dihydroquinolinylidene-2)ethylidene]-1(3-carboxymethyl-4-oxo-2-thio-5-thiazolidinylidene)-4-thiazolidone.

17. The recording element according to claim 14 wherein said merocyanine dye is 3-n-Heptyl-5[(3-ethyl-2-benzothiazolinylidene)ethylidene]-2(3-carboxymethyl-4-oxo-2-thio-5-thiazolidinylidene)-4-thiazolidone.

18. The recording element according to claim 14 wherein said merocyanine dye is 3-Ethyl-5[(5-chloro-3-ethyl-2-benzothiazolinylidene)ethylidene]-2(3-carboxymethyl-4-oxo-2-thio-5-thiazolidinylidene)-4-thiazolidone.

* * * * *

UNITED STATES PATENT OFFICE
CERTIFICATE OF CORRECTION

Patent No. 3,719,495                         Dated March 6, 1973

Inventor(s) Bernard A. Lea

It is certified that error appears in the above-identified patent and that said Letters Patent are hereby corrected as shown below:

Col. 3, line 21, "recoding" should be --recording--.

Col. 6, Example 3, line 56, "3-carboxymethyl-24-thiazolidone" should be --3-carboxymethyl-2-thio-4-thiazolidone--.

Col. 7, Example 8, line 66, after "-2-thio-5" and before "[(3-", add -- -thiazolidinylidene)-4-thiazolidone. 3-Carboxymethyl-5 --.

Col. 8, Example 10, line 37, "3-carboxymethyl-24-one" should be --3-carboxymethyl-2-thio-thiazolid-4-one--.

Col. 11, Example 21, line 31, after "(20" add --ml)--.

Col. 11, Example 22, line 58, "wit" should be --with--.

Col. 12, Example 25, line 46, "wit" should be --with--.

Col. 12, Example 25, line 53, "cooking" should be --cooling--.

Signed and sealed this 18th day of December 1973.

(SEAL)
Attest:

EDWARD M. FLETCHER, JR.                RENE D. TEGTMEYER
Attesting Officer                      Acting Commissioner of Patents